United States Patent
Tian et al.

(10) Patent No.: US 11,576,065 B2
(45) Date of Patent: Feb. 7, 2023

(54) METHOD, DEVICE, AND STORAGE MEDIUM FOR COMMUNICATION WAVEFORM PERFORMANCE PREDICATION

(71) Applicant: INTELLIGENT FUSION TECHNOLOGY, INC., Germantown, MD (US)

(72) Inventors: Xin Tian, Germantown, MD (US); Yi Li, Germantown, MD (US); Genshe Chen, Germantown, MD (US); Khanh Pham, Kirtland AFB, NM (US); Erik Blasch, Arlington, VA (US)

(73) Assignee: INTELLIGENT FUSION TECHNOLOGY, INC., Germantown, MD (US)

(*) Notice: Subject to any disclaimer, the term of this patent is extended or adjusted under 35 U.S.C. 154(b) by 70 days.

(21) Appl. No.: 17/332,534

(22) Filed: May 27, 2021

(65) Prior Publication Data
US 2021/0377763 A1 Dec. 2, 2021

Related U.S. Application Data

(60) Provisional application No. 63/033,459, filed on Jun. 2, 2020.

(51) Int. Cl.
*H04W 24/08* (2009.01)
*G06N 3/08* (2006.01)
(Continued)

(52) U.S. Cl.
CPC .............. *H04W 24/08* (2013.01); *G06N 3/08* (2013.01); *H04W 52/241* (2013.01); *H04W 72/085* (2013.01)

(58) Field of Classification Search
CPC ................ H04W 24/08; H04W 24/04; H04W 52/241; H04W 52/223; H04W 72/085; G06N 3/08; H04B 17/373
See application file for complete search history.

(56) References Cited

U.S. PATENT DOCUMENTS

| 10,638,482 | B2* | 4/2020 | Zhu | ............... H04B 7/088 |
| 2018/0269968 | A1* | 9/2018 | Zhuge | ........... H04B 10/07953 |

(Continued)

*Primary Examiner* — Hassan Kizou
*Assistant Examiner* — Hector Reyes
(74) *Attorney, Agent, or Firm* — Anova Law Group, PLLC

(57) ABSTRACT

Various embodiments of the present disclosure provide a method, a device, and a storage medium for performance prediction of a communication waveform in a communication system. The method includes measuring, by a receiver, an actual SNR distribution of a communication link between a transmitter and the receiver; further includes evaluating, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution; and further includes, according to the normalized minimum SNR shift, obtaining, by a waveform performance prediction device, an actual minimum SNR shift for the actual SNR distribution, where according to the actual minimum SNR shift, the communication system is adjusted for operation.

20 Claims, 4 Drawing Sheets

---

S100 — Measuring, by a receiver, an actual SNR distribution covering an SNR range of a communication link between a transmitter and the receiver S102 — Evaluating, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution S104 — According to the normalized minimum SNR shift, obtaining, by a waveform performance prediction device, an actual minimum SNR shift for the actual SNR distribution, where according to the actual minimum SNR shift, the communication system is adjusted for operation

(51) Int. Cl.
*H04W 72/08* (2009.01)
*H04W 52/24* (2009.01)

(56) References Cited

U.S. PATENT DOCUMENTS

| | | | |
|---|---|---|---|
| 2019/0277957 A1* | 9/2019 | Chandrasekhar | G01S 5/017 |
| 2021/0135771 A1* | 5/2021 | Schaefer | H04L 41/145 |
| 2021/0383207 A1* | 12/2021 | Beery | H03M 13/37 |

* cited by examiner

METHOD, DEVICE, AND STORAGE MEDIUM FOR COMMUNICATION WAVEFORM PERFORMANCE PREDICATION

CROSS-REFERENCE TO RELATED APPLICATION

This application claims the priority of U.S. Provisional Application No. 63/033,459, filed on Jun. 2, 2020, the content of which is incorporated herein by reference in its entirety.

GOVERNMENT RIGHTS

The present disclosure was made with Government support under Contract No. FA9453-16-C-0428, awarded by the United States Air Force Research Laboratory. The U.S. Government has certain rights in the present disclosure.

FIELD OF THE DISCLOSURE

The present disclosure generally relates to the field of communication technology and, more particularly, relates to a method, a device, and a storage medium for communication waveform performance predication in partial band partial time jamming radio frequency environment.

BACKGROUND

For waveform selection and transmission power control in communication systems, it is important to determine required signal-to-noise ratio (SNR) levels for waveforms to operate. In a radio frequency (RF) environment where the link SNR is consistent or has a single modal distribution, the required SNR level of a waveform (modulation and forward error coding scheme (FEC)) can be obtained. However, in a Partial Band Partial Time (PBPT) jamming RF environment, the SNR of a communication link changes rapidly over time, such that symbols of a code word may have very different SNR conditions. Typical PBPT jamming RF environments present in frequency hopping (FH) communication systems, where the SNR levels of different hops can be significantly different due to different interference conditions over the hops' frequency bands.

BRIEF SUMMARY OF THE DISCLOSURE

One aspect or embodiment of the present disclosure provides a method for performance prediction of a communication waveform in a communication system. The method includes measuring, by a receiver, an actual SNR distribution of a communication link between a transmitter and the receiver; further includes evaluating, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution; and further includes according to the normalized minimum SNR shift, obtaining, by a waveform performance prediction device, an actual minimum SNR shift for the actual SNR distribution, where according to the actual minimum SNR shift, the communication system is adjusted for operation.

Optionally, an NN input of the neural network is the normalized SNR distribution; and an NN output of the neural network is the normalized minimum SNR shift required for the communication waveform to operate.

Optionally, the NN input corresponds to probability masses of a plurality of SNR levels over an SNR range; and the NN output is the normalized minimum SNR shift corresponding to the NN input.

Optionally, the method further includes generating training samples for the communication waveform by evaluating normalized minimum SNR shifts for a plurality of normalized SNR distributions; and training the NN with the training samples by reducing a training loss.

Optionally, each training sample includes a normalized SNR distribution and a corresponding normalized minimum SNR shift required for the communication waveform to operate.

Optionally, the method further includes generating each training sample by performing: generating a plurality of link conditions, each link condition corresponding to the normalized SNR distribution and an SNR shift of a plurality of SNR shifts; and evaluating the performance of the communication waveform using each of the plurality of link conditions to find a minimum SNR shift from the plurality of SNR shifts, where the minimum SNR shift is determined as the normalized minimum SNR shift required for the communication waveform to operate.

Optionally, the communication system is adjusted by changing a transmission power and/or by selecting another communication waveform for operation.

Another aspect or embodiment of the present disclosure provides a device for performance prediction of a communication waveform over a communication link. The device includes a memory, configured to store program instructions for performing a method for transaction clearing; and a processor, coupled with the memory and, when executing the program instructions, configured to: measure, by a receiver, an actual SNR distribution of a communication link between a transmitter and the receiver; evaluate, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution; and according to the normalized minimum SNR shift, obtain, by a waveform performance prediction device, an actual minimum SNR shift for the actual SNR distribution, where according to the actual minimum SNR shift, the communication system is adjusted for operation.

Optionally, an NN input of the neural network is the normalized SNR distribution; and an NN output of the neural network is the normalized minimum SNR shift required for the communication waveform to operate.

Optionally, the NN input corresponds to probability masses of a plurality of SNR levels over the SNR range; and the NN output is the normalized minimum SNR shift corresponding to the NN input.

Optionally, the processor is further configured to: generate training samples for the communication waveform by evaluating normalized minimum SNR shifts for a plurality of normalized SNR distributions; and train the NN with the training samples by reducing a training loss.

Optionally, each training sample includes a normalized SNR distribution and a corresponding normalized minimum SNR shift required for the communication waveform to operate.

Optionally, the processor is further configured to generate each training sample by performing: generating a plurality of link conditions, each link condition corresponding to the normalized SNR distribution and an SNR shift of a plurality of SNR shifts; and evaluating the performance of the communication waveform using each of the plurality of link conditions to find a minimum SNR shift from the plurality of SNR shifts, where the minimum SNR shift is determined as the normalized minimum SNR shift required for the communication waveform to operate.

Optionally, the communication system is adjusted by changing a transmission power and/or by selecting another communication waveform for operation.

Another aspect or embodiment of the present disclosure provides a non-transitory computer-readable storage medium, containing program instructions for, when being executed by a processor, performing a method for performance prediction of a communication waveform over a communication link. The method includes measuring, by a receiver, an actual SNR distribution of a communication link between a transmitter and the receiver; further includes evaluating, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution; and further includes according to the normalized minimum SNR shift, obtaining, by a waveform performance prediction device, an actual minimum SNR shift for the actual SNR distribution, where according to the actual minimum SNR shift, the communication system is adjusted for operation.

Optionally, an NN input of the neural network is the normalized SNR distribution; and an NN output of the neural network is the normalized minimum SNR shift required for the communication waveform to operate.

Optionally, the NN input corresponds to probability masses of a plurality of SNR levels over the SNR range; and the NN output is the normalized minimum SNR shift corresponding to the NN input.

Optionally, the method further includes: generating training samples for the communication waveform by evaluating normalized minimum SNR shifts for a plurality of normalized SNR distributions; and training the NN with the training samples by reducing a training loss.

Optionally, each training sample includes a normalized SNR distribution and a corresponding normalized minimum SNR shift required for the communication waveform to operate.

Optionally, the method further includes generating each training sample by performing: generating a plurality of link conditions, each link condition corresponding to the normalized SNR distribution and an SNR shift of a plurality of SNR shifts; and evaluating the performance of the communication waveform using each of the plurality of link conditions to find a minimum SNR shift from the plurality of SNR shifts, where the minimum SNR shift is determined as the normalized minimum SNR shift required for the communication waveform to operate.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

References may be made in detail to exemplary embodiments of the disclosure hereinafter, which are illustrated in the accompanying drawings. Wherever possible, same reference numbers may be used throughout the drawings to refer to same or similar parts.

These embodiments are described in sufficient detail to enable those skilled in the art to practice the disclosure; and it should be understood that other embodiments may be utilized, and modifications or changes may be made without departing from the scope of the disclosure. The following description is, therefore, merely exemplary.

In complex radio frequency (RF) environments, the signal-to-noise ratio (SNR) of a communication link may be characterized by a probability distribution of SNR levels. The SNR distribution of a communication link can be measured by a receiver in the communication system. In general, the SNR distribution can be obtained as a probability mass function (pmf) over a range of discrete SNR levels. The control of the transmission power is able to shift the link SNR distribution up or down without altering the distribution's shape. In the present disclosure, a minimum SNR shift of the link SNR distribution, which is required for a communication waveform to operate (with a sufficiently low bit error rate, for example, $10^{-7}$), may be determined according to various embodiments of the present disclosure. A method based on neural network (NN) may be used to evaluate the required minimum SNR shift. The NN input may be a normalized SNR distribution which is a shifted version of an actual (e.g., measured) link SNR distribution. The NN output may be the required minimum SNR shift (i.e., a normalized minimum SNR shift) of the normalized SNR distribution, such that the communication waveform may be able to operate. After a training process, the NN may be able to accurately evaluate the required normalized minimum SNR shifts for a range of normalized link SNR distributions (corresponding to various complex communication link SNR conditions). Using the normalized minimum SNR shift, it is convenient to obtain the minimum SNR shift (i.e., an actual minimum SNR shift) required for the actual link SNR distribution (measured by the receiver), such that the waveform is able to operate. Based on the actual minimum SNR shift, accurate transmission power control and/or waveform selection can be achieved in communication systems operating in complex RF environments, which lead to superior communication performance and robustness.

Various embodiments of the present disclosure provide a method, a device, and a storage medium for communication waveform performance predication in partial band partial time jamming radio frequency environment.

Figure 1:
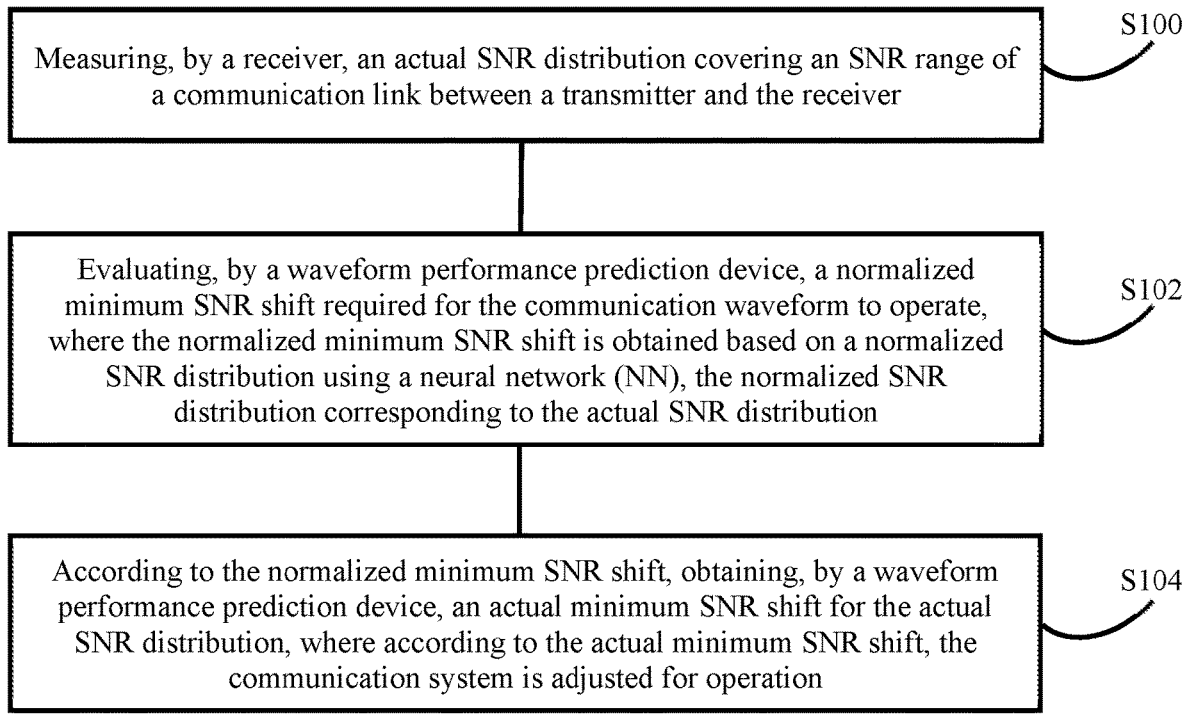
FIG. 1 depicts an exemplary neural network based method for performance prediction of a communication waveform according to various disclosed embodiments.

FIG. 1 depicts an exemplary neural network based method for performance prediction of a communication waveform according to various disclosed embodiments.

The neural network based method for communication waveform performance prediction may be described hereinafter. According to various embodiments of the present disclosure, the method may include the following steps.

In S100, an actual SNR distribution, of a communication link between a transmitter and the receiver may be measured by a receiver. In general, the actual SNR distribution can be obtained as a probability mass function (pmf) over a range of discretized SNR levels.

In S102, a normalized minimum SNR shift required for the communication waveform to operate may be evaluated by a waveform performance prediction device, where the normalized minimum SNR shift is obtained based on a normalized SNR distribution using a neural network (NN), the normalized SNR distribution corresponding to the actual SNR distribution.

According to various embodiments of the present disclosure, the normalized SNR distribution may be derived from the actual (measured) SNR distribution of the communication link. The normalized SNR distribution may be a shifted version of the actual SNR distribution from S100.

According to various embodiments of the present disclosure, the NN may be used to evaluate the minimum SNR shift (i.e., the normalized minimum SNR shift) of the normalized SNR distribution from S102, such that the communication waveform may be able to operate.

In S104, according to the normalized minimum SNR shift, an actual minimum SNR shift for the actual SNR distribution may be obtained by a waveform performance prediction device, where according to the actual minimum SNR shift, the communication system is adjusted for operation. For example, the normalized minimum SNR shift evaluated from S102 may be used to derive the actual SNR shift which is the minimum SNR shift required on the actual SNR distribution (i.e., the actual minimum SNR shift), such that the communication waveform may be able to operate.

In S102, the NN input of the neural network may be the normalized SNR distribution; the NN output of the neural network may be the normalized minimum SNR shift required for the communication waveform to operate, such that the communication waveform can operate; and the NN may be a multi-layer NN.

For example, the NN input may correspond to probability masses of a plurality of SNR levels over the SNR range; and the NN output may be the normalized minimum SNR shift corresponding to the NN input.

According to various embodiments of the present disclosure, the method may further include generating training samples for the communication waveform by evaluating normalized minimum SNR shifts for a plurality of normalized SNR distributions; and training the NN with the training samples to reduce the training loss and improve predication accuracy.

According to various embodiments of the present disclosure, the communication system may be adjusted by changing a transmission power and/or by selecting another communication waveform for operation.

Figure 2:
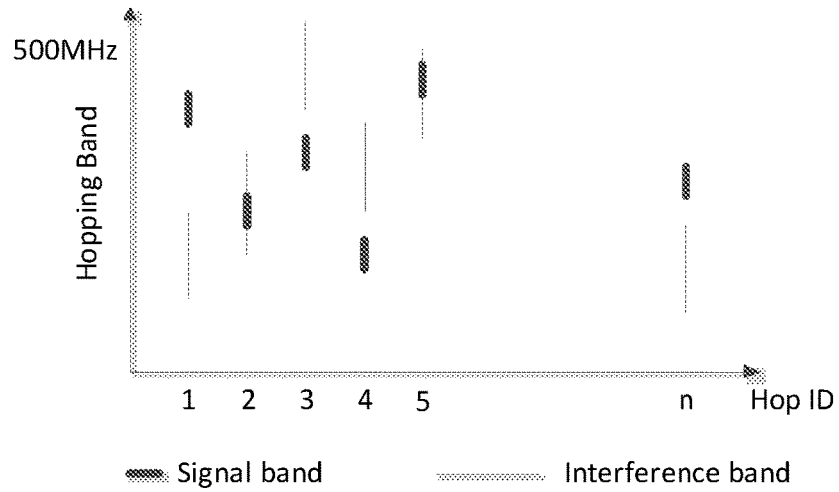
FIG. 2 depicts an exemplary time-spectrum pattern of a communication link and interference in a frequency hopping (FH) communication system according to various disclosed embodiments.
Figure 3:
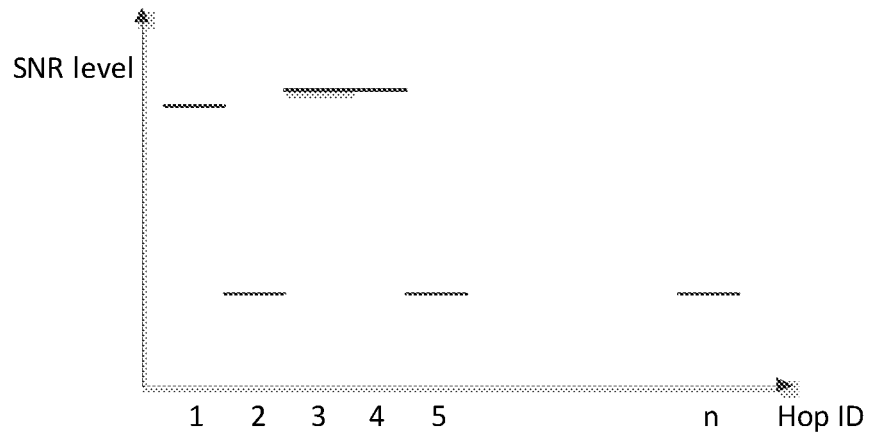
FIG. 3 depicts exemplary SNR levels of a communication link in a frequency hopping (FH) communication system according to various disclosed embodiments.

FIG. 2 depicts an exemplary time-spectrum pattern of a communication link and interference in a frequency hopping (FH) communication system according to various disclosed embodiments; and FIG. 3 depicts exemplary SNR levels of the communication link in the frequency hopping (FH) communication system according to various disclosed embodiments.

Referring to FIG. 2, the Y axis is a (500 MHz) hopping spectrum band, and the X axis shows the hop ID. The thick short bars illustrate the spectrum bands occupied by the communication link at the hops; and the thin and longer bars illustrate the spectrum band of RF interferences at the hops. Referring to FIG. 3, hops with high SNR levels (e.g., hops 1, 3, 4, . . . n) may correspond to the hops where the spectrum band of the communication link does not overlap the interference spectrum band. Hops with low SNR levels (e.g., hops 2 and 5) may correspond to the hops where the spectrum band of the communication link may collide with the spectrum band of an interference.

In complex RF environments, the SNR of the communication link may have multi-modal distribution, and the required SNR level for a communication waveform may be much more difficult to be evaluated.

Figure 4:
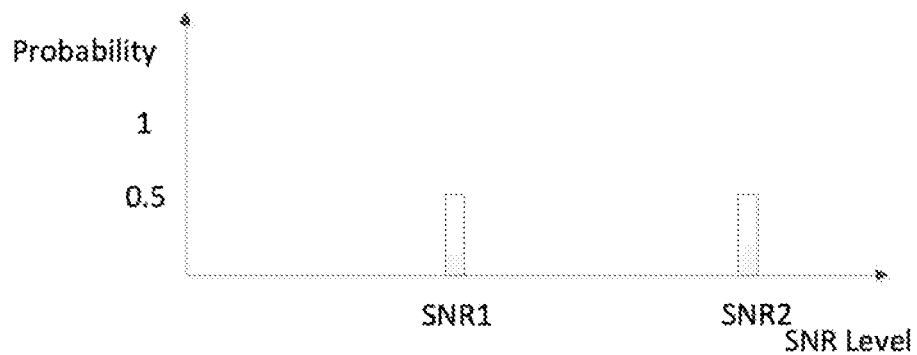
FIG. 4 depicts an exemplary bi-modal per-hop SNR distribution in a frequency hopping (FH) communication system according to various disclosed embodiments.

FIG. 4 depicts an exemplary bi-modal per-hop SNR distribution in the frequency hopping (FH) communication system according to various disclosed embodiments. Referring to FIG. 4, an exemplary case of the per-hop SNR distribution in the FH communication system may be illustrated, where the SNR levels of communication hops may follow the bi-modal distribution. The bi-modal distribution may happen when half of the HF band may be affected by interference and the other half may not be affected by interference. When the communication link hops to the frequency band being affected by interference, the SNR may be at a low level, and when the communication hop is not affected by the interference, the SNR may be at a high level.

It is assumed that a level $SNR_1=V_L$ has a probability $P_L=0.5$ and a level $SNR_2=V_H$ has a probability PH=0.5. Table 1 illustrates required $V_L$ (SNR) levels versus Delta=$V_H-V_L$ for various modulation and Low Density Parity Check (LDPC) coding combinations (MC) following digital video broadcasting second generation (DVB-S2) waveforms. Required $V_L$ levels for different modulation/coding combination versus Delta=$V_H-V_L$ may be shown the following table 1.

TABLE 1

| MC | Delta (dB) | | | | | | | | | | | |
|---|---|---|---|---|---|---|---|---|---|---|---|---|
| | 0 | 2 | 4 | 6 | 8 | 10 | 12 | 14 | 16 | 18 | 20 | 22 |
| 8PSK 8/9 | 11 | 10 | 9.5 | 9 | 9 | 9 | 9 | 9 | 9 | 9 | 9 | 9 |
| 8PSK 3/4 | 8 | 7.5 | 6.5 | 6 | 5.5 | 5.5 | 5.5 | 5.5 | 5.5 | 5.5 | 5.5 | 5.5 |
| 8PSK 3/5 | 6 | 5 | 4 | 3.5 | 2.5 | 2 | 1.5 | 1 | 1 | 1 | 1 | 1 |

TABLE 1-continued

| | Delta (dB) | | | | | | | | | | | |
|---|---|---|---|---|---|---|---|---|---|---|---|---|
| MC | 0 | 2 | 4 | 6 | 8 | 10 | 12 | 14 | 16 | 18 | 20 | 22 |
| QPSK 2/3 | 3.5 | 2.5 | 2 | 1 | 1 | 0.5 | 0.5 | 0.5 | 0.5 | 0.5 | 0.5 | 0.5 |
| QPSK 1/2 | 1.5 | 1 | −0.5 | −1.5 | −2.5 | −3.5 | −4 | −4 | −4 | −4.5 | −5 | −5 |
| QPSK 1/3 | −0.5 | −1.5 | −2.5 | −4 | −5 | −6 | −7 | −8 | −9 | −11 | −13 | −15 |
| QPSK 1/4 | −1.5 | −2.5 | −3.5 | −5 | −6.5 | −7.5 | −9.5 | −10.5 | −11.6 | −13.5 | −15.5 | −17.5 |

A conventional way of determining the required SNR level for a waveform to work in FH communication systems uses the average of SNR levels of a communication link. However, it may be seen that for the modulation/coding combination, the required average SNR levels (e.g., $(V_L+V_H)/2$) may be significant different when Deltas are different. For example, for 8PSK 8/9, the required average SNR levels may range from 11 dB to 20 dB for the range of Delta values. As a result, the average SNR level of the communication link may not be used to effectively determine the waveform's working SNR requirement in complex RF environments.

In a FH communication system, the SNR distribution of a communication link may have a multi-modal probability mass function (pmf) with each modal corresponding to an interference condition over the hops. The SNR distribution of the communication link (i.e., the actual SNR distribution) may be obtained (i.e., measured) at the receiver. In general, the actual SNR distribution may be obtained as a probability mass function (pmf) over a range of discretized SNR levels. In a communication system, the control on transmission power (at the sender side) may shift the link SNR distribution up or down. For a given SNR distribution (pmf) of a communication link, it is important to determine how much the link SNR distribution (pmf) should be shifted, such that a given/selected waveform (e.g., a modulation/coding combination) can operate (i.e., satisfying the low error rate requirement, for example, $10^{-10}$).

Figure 5A:
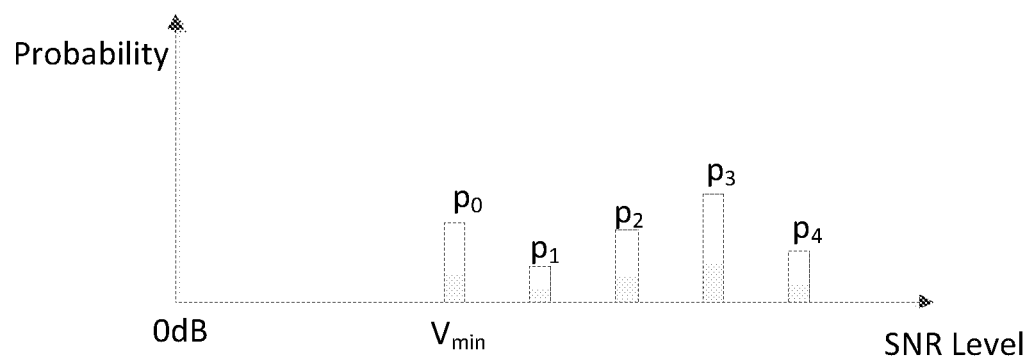
FIG. 5A depicts an exemplary actual SNR distribution of a communication link obtained by a receiver according to various disclosed embodiments.
Figure 5B:
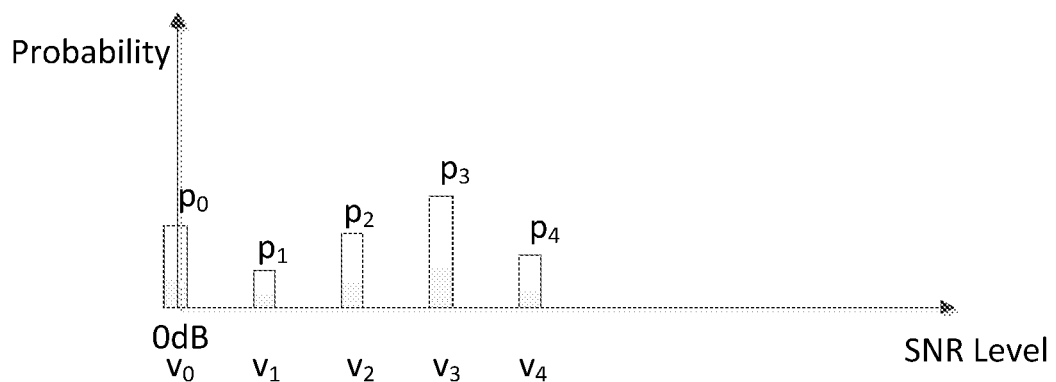
FIG. 5B depicts a normalized SNR distribution corresponding to an exemplary actual SNR distribution from FIG. 5A according to various disclosed embodiments.

According to various embodiments of the present disclosure, for a given SNR distribution (pmf), a normalized SNR distribution (pmf) may be derived. FIG. 5A illustrates an exemplary actual SNR distribution of the communication link obtained by the receiver according to various disclosed embodiments, where the minimum SNR level in the actual SNR distribution is denoted as $V_{min}$. FIG. 5B depicts a normalized SNR distribution (pmf) corresponding to the exemplary actual SNR distribution from FIG. 5A according to various disclosed embodiments. The normalized SNR distribution may be a shifted version of the actual SNR distribution. As shown in FIG. 5B, one way for obtaining the normalized SNR distribution may be to shift the actual SNR distribution, such that the minimum SNR level in the distribution, denoted as $V_0$, is 0 dB. The normalized SNR distribution may have the same shape as the actual SNR distribution, and all SNR distributions having the same shape may have the same normalized SNR distribution.

Figure 6:
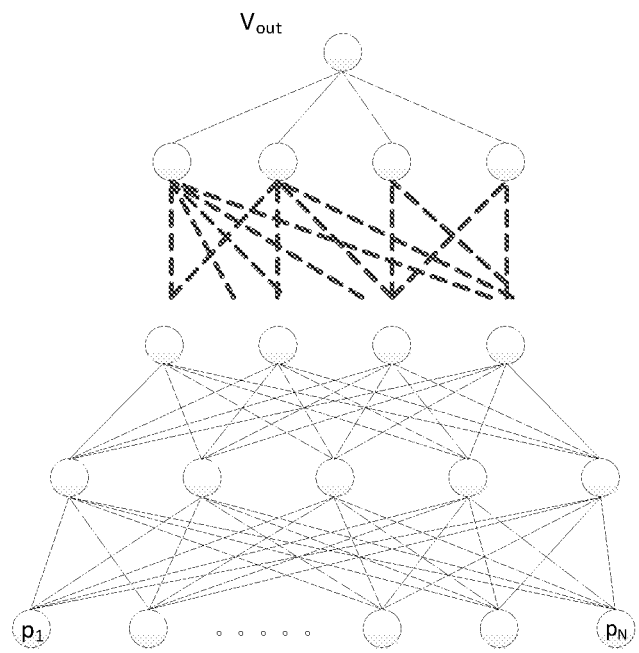
FIG. 6 depicts an exemplary neural network (NN) architecture for the evaluation of normalized minimum SNR shifts according to various disclosed embodiments.

According to various embodiments of the present disclosure, the neural network (NN) may be trained and used to evaluate the required minimum SNR shift of the normalized SNR distribution, i.e., the normalized minimum SNR shift, such that a waveform (e.g., modulation/coding combination) may be able to operate. FIG. 6 depicts an exemplary neural network (NN) architecture for the evaluation of the normalized minimum SNR shifts, according to various disclosed embodiments. The input to the neural network $p_1$ to $p_N$, (e.g., N=40) may correspond to the probability masses of a discretized normalized pmf on SNR levels from $V_1$ to $V_N$, which cover a sufficient SNR range. For example, if the maximum SNR level in the normalized SNR distribution (pmf) is assumed to be $V_{max}$=20 dB, and the distribution (pmf) is discretized with a resolution of r=0.5 dB, the following values may be calculated: $V_1$=r=0.5 dB, N=$(V_{max}/r)$=40, $V_N$=$V_{max}$=20 dB, $V_1$=$V_0$+r*i dB, where i is an integer from 1 to N. $p_1$ to $p_N$ may be the probability masses at SNR levels $V_1$ to $V_N$ according to the normalized SNR distribution (pmf). It should be noted that the minimum SNR level ($V_0$) of the normalized distribution (pmf) is fixed, e.g., 0 dB, and its corresponding probability mass $p_0$ may be derived from $p_1$ to $p_N$. As a result, $p_0$ may be omitted in the NN input, thereby reducing the NN input dimension by 1. It should be noted that there are a variety of ways to derive normalized SNR distributions (pmf) for actual SNR distributions. In addition, a SNR distribution (pmf) may be represented with a normalized pmf and a SNR shift.

It should be noted that the derivation of $p_1$ to $p_N$ from the SNR distribution (pmf) may introduce certain accuracy loss. The resolution level r may be configured at a level which is necessarily low to provide sufficient accuracy. With r as 0.5 dB, 0.5 dB accuracy may be sufficient for decision making in communication systems.

For example, a normalized SNR distribution (pmf) may have probabilities [0.1 0.1 0.3 0.4 0.1] on SNR levels [0 2 12 14 18] dB. With a resolution of r=0.5 dB, the converted NN input [$p_1$ ... $p_{40}$] is $p_{vec}$=[0 0 0 0.1 0 0 0 0 0 0 0 0 0 0 0 0 0 0 0 0 0 0 0 0 0.3 0 0 0 0.4 0 0 0 0 0 0 0 0.1 0 0 0 0].

In order to train the NN, training data samples may be generated according to various embodiments of the present disclosure. Each training data sample may include a normalized SNR distribution and a corresponding normalized minimum SNR shift required for the waveform to operate. Training samples of normalized SNR distributions may be generated to over a sufficient range of normalized SNR distributions. For each sample of the normalized SNR distribution, the corresponding normalized minimum SNR shift may be obtained by, for example, simulation or emulation methods. For example, a sample normalized SNR distribution may have probabilities [0.1 0.1 0.3 0.4 0.1] on SNR levels [0 2 12 14 18] dB. Through simulation, it is determined that the waveform of interest, e.g., (8PSK with coding rate 3/4), is able to operate (i.e., having a sufficiently low bit error rate, for example $10^{-7}$) when the normalized SNR distribution is shifted for at least −0.5 dB. Then the normalized SNR distribution and the normalized minimum SNR shift (i.e., −0.5 dB) may provide a training sample pair for the NN. More NN training data may be obtained for different normalized SNR distributions (pmf) according to various embodiments of the present disclosure.

With the normalized minimum SNR shift, e.g., $V_{out}$ from the NN, it is convenient to derive the actual minimum SNR shift, which is needed on the actual measured link SNR distribution, for the waveform to operate. The actual minimum SNR shift is given by $V_{out}+V_0-V_{min}$, where $V_{min}$ is the minimum SNR level of the actual link SNR distribution, and $V_0$ is the minimum SNR level of the normalized SNR distribution. If the evaluated actual minimum SNR shift is greater than zero, the waveform may not be able to operate in the SNR condition of the current communication link. In such cases, the communication system may increase its transmission power to shift the link SNR distribution accordingly, or use a different waveform that is determined to be able to operate in the current link SNR condition.

As shown in FIG. 6, the NN may have a plurality of hidden layers. The number of the hidden layers and the number of nodes in each hidden layer may be selected, according to actual situations, to achieve desirable trade off in the NN training error and the errors on new distribution (pmf) input, which may not be limited according to various embodiments of the present disclosure.

In an implementation manner, for the NN design, the input layer may have 40 nodes (i.e., [$p_1$ ... $p_{40}$] as probability masses over [0.5 1 ... 20] dB). For example, two hidden layers may be included in the NN. The first hidden layer may have 32 nodes, which are fully connected to the input layer; and the second hidden layer may have 16 nodes which are fully connected with nodes of the first hidden layer. All of the hidden layer nodes may use "Relu" activation function. The output layer may contain one node which is fully connected to the second hidden layer. For the NN training, the loss function may be selected as mean squared error loss.

For a waveform modulation coding combination (e.g., 8PSK modulation and LDPC with a coding rate ¾), the samples of normalized SNR distributions (pmf) and normalized minimum SNR shifts (denoted as $V_{out}$) may be obtained by simulation for the NN training, validation and testing purposes. Neural Networks for other waveforms may be trained according to the same manner.

The generation of each training sample may involve generating a plurality of link conditions, each link condition corresponding to the normalized SNR distribution and an SNR shift of a plurality of SNR shifts; and evaluating the operation/performance of the communication waveform using each of the plurality of link conditions to find a minimum SNR shift from the plurality of SNR shifts, where the minimum SNR shift is determined as the normalized minimum SNR shift required for the communication waveform to operate. Each training sample may include a normalized SNR distribution and a corresponding normalized minimum SNR shift required for the communication waveform to operate. The set of normalized SNR distributions may be chosen to provide a desirable coverage of a desired range of SNR distributions.

Figure 7:
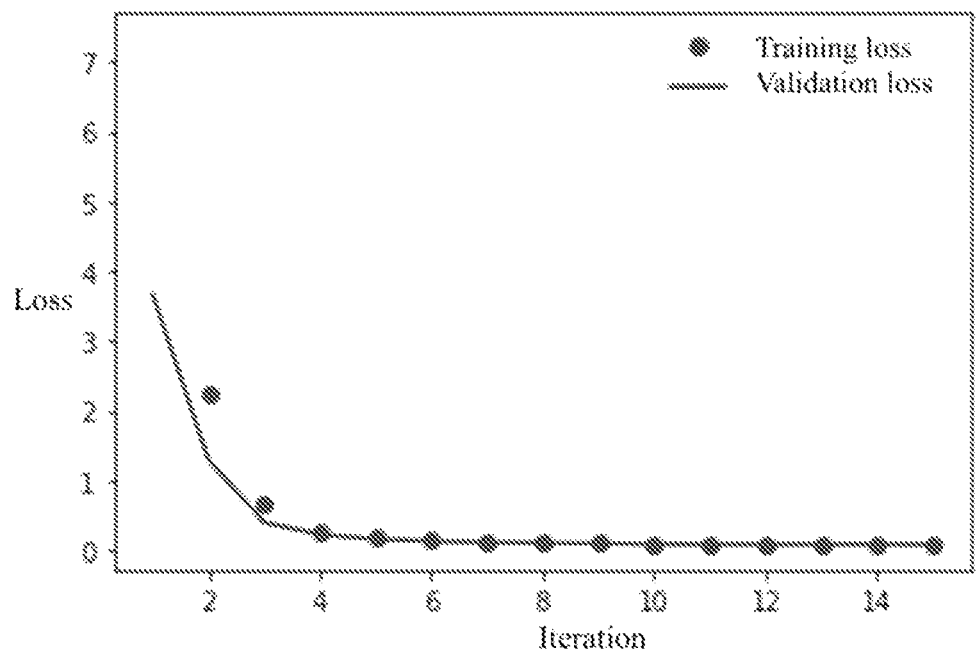
FIG. 7 depicts training and validation losses of an exemplary neural network (NN) training process according to various disclosed embodiments.

FIG. 7 depicts the training and validation losses of an exemplary neural network (NN) training process according to various disclosed embodiments. FIG. 7 may show the NN training and validation results using 8312 training samples and 2079 validation samples. According to various embodiments of the present disclosure, it can be seen that as the NN training epoch increases, both the training loss and the validation loss of the NN may decrease, which may indicate no NN overfitting to training data. The converged mean square error (MSE) loss may be below 0.1, which may correspond to errors of $V_{out}$ levels significantly below 0.5 dB. Over another set of 2600 testing SNR distribution (pmf) and $V_{out}$ samples, the NN prediction of $V_{out}$ may have a MSE loss of 0.0781, which may yield accurate prediction of required $V_{out}$ levels.

According to various embodiments of the present disclosure, it may show that the trained NN may be able to accurately predict the required minimum SNR shift for the communication waveform to operate when the link SNR has a multi-modal distribution. The NN based method accounting for the entire SNR distribution of the communication link may have a significant advantage in accuracy over conventional average SNR based approach in complex RF environments.

Various embodiments of the present disclosure further provide a device, including a memory, configured to store program instructions for performing a method for performance prediction of a communication waveform in a communication system; and a processor, coupled with the memory and, when executing the program instructions, configured to: measure, by a receiver, an actual SNR distribution of a communication link between a transmitter and the receiver; evaluate, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution; and according to the normalized minimum SNR shift, obtain, by a waveform performance prediction device, an actual minimum SNR shift for the actual SNR distribution, where according to the actual minimum SNR shift, the communication system is adjusted for operation.

Various embodiments of the present disclosure further provide a non-transitory computer-readable storage medium, containing program instructions for, when being executed by a processor, performing a method for performance prediction of a communication waveform in a communication system. The method includes measuring, by a receiver, an actual SNR distribution of a communication link between a transmitter and the receiver; evaluating, by a waveform performance prediction device, a normalized minimum SNR shift required for the communication waveform to operate, where the normalized minimum SNR shift is obtained based on a normalized SNR distribution using a neural network (NN), the normalized SNR distribution corresponding to the actual SNR distribution; and according to the normalized minimum SNR shift, obtaining, by a waveform performance prediction device, an actual minimum SNR shift for the actual SNR distribution, where according to the actual minimum SNR shift, the communication system is adjusted for operation.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

It should be understood that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. In certain cases, the numerical values as stated for the parameter can take on negative values.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for performance prediction of a communication waveform in a communication system, comprising:
measuring, by a receiver, an actual SNR distribution of a communication link between a transmitter and the receiver;
evaluating, by a waveform performance prediction device, a normalized minimum SNR shift required for the communication waveform to operate, wherein the normalized minimum SNR shift is obtained based on a normalized SNR distribution using a neural network (NN), the normalized SNR distribution corresponding to the actual SNR distribution; and
according to the normalized minimum SNR shift, obtaining, by a waveform performance prediction device, an actual minimum SNR shift for the actual SNR distribution, wherein according to the actual minimum SNR shift, the communication system is adjusted for operation.

2. The method according to claim 1, wherein:
an NN input of the neural network is the normalized SNR distribution; and
an NN output of the neural network is the normalized minimum SNR shift required for the communication waveform to operate.

3. The method according to claim 2, wherein:
the NN input corresponds to probability masses of a plurality of SNR levels over an SNR range; and
the NN output is the normalized minimum SNR shift corresponding to the NN input.

4. The method according to claim 1, further including:
generating training samples for the communication waveform by evaluating normalized minimum SNR shifts for a plurality of normalized SNR distributions; and
training the NN with the training samples by reducing a training loss.

5. The method according to claim 4, wherein:
each training sample includes a normalized SNR distribution and a corresponding normalized minimum SNR shift required for the communication waveform to operate.

6. The method according to claim 5, further including generating each training sample by performing:
generating a plurality of link conditions, each link condition corresponding to the normalized SNR distribution and an SNR shift of a plurality of SNR shifts; and
evaluating the performance of the communication waveform using each of the plurality of link conditions to find a minimum SNR shift from the plurality of SNR shifts, wherein the minimum SNR shift is determined as the normalized minimum SNR shift required for the communication waveform to operate.

7. The method according to claim 1, wherein:
the communication system is adjusted by changing a transmission power and/or by selecting another communication waveform for operation.

8. A device for performance prediction of a communication waveform over a communication link, comprising:
a memory, configured to store program instructions for performing a method for performance prediction of a communication waveform in a communication system; and
a processor, coupled with the memory and, when executing the program instructions, configured to:
measure, by a receiver, an actual SNR distribution of a communication link between a transmitter and the receiver;
evaluate, by a waveform performance prediction device, a normalized minimum SNR shift required for the communication waveform to operate, wherein the normalized minimum SNR shift is obtained based on a normalized SNR distribution using a neural network (NN), the normalized SNR distribution corresponding to the actual SNR distribution; and
according to the normalized minimum SNR shift, obtain, by a waveform performance prediction device, an actual minimum SNR shift for the actual SNR distribution, wherein according to the actual minimum SNR shift, the communication system is adjusted for operation.

9. The device according to claim 8, wherein:
an NN input of the neural network is the normalized SNR distribution; and
an NN output of the neural network is the normalized minimum SNR shift required for the communication waveform to operate.

10. The device according to claim 9, wherein:
the NN input corresponds to probability masses of a plurality of SNR levels over an SNR range; and
the NN output is the normalized minimum SNR shift corresponding to the NN input.

11. The device according to claim 8, wherein the processor is further configured to:
generate training samples for the communication waveform by evaluating normalized minimum SNR shifts for a plurality of normalized SNR distributions; and
train the NN with the training samples by reducing a training loss.

12. The device according to claim 11, wherein:
each training sample includes a normalized SNR distribution and a corresponding normalized minimum SNR shift required for the communication waveform to operate.

13. The device according to claim 12, wherein the processor is further configured to generate each training sample by performing:
generating a plurality of link conditions, each link condition corresponding to the normalized SNR distribution and an SNR shift of a plurality of SNR shifts; and
evaluating the performance of the communication waveform using each of the plurality of link conditions to find a minimum SNR shift from the plurality of SNR shifts, wherein the minimum SNR shift is determined as the normalized minimum SNR shift required for the communication waveform to operate.

14. The device according to claim 8, wherein:
the communication system is adjusted by changing a transmission power and/or by selecting another communication waveform for operation.

15. A non-transitory computer-readable storage medium, containing program instructions for, when being executed by a processor, performing a method for performance prediction of a communication waveform in a communication system, the method comprising:
  measuring, by a receiver, an actual SNR distribution of a communication link between a transmitter and the receiver;
  evaluating, by a waveform performance prediction device, a normalized minimum SNR shift required for the communication waveform to operate, wherein the normalized minimum SNR shift is obtained based on a normalized SNR distribution using a neural network (NN), the normalized SNR distribution corresponding to the actual SNR distribution; and
  according to the normalized minimum SNR shift, obtaining, by a waveform performance prediction device, an actual minimum SNR shift for the actual SNR distribution, wherein according to the actual minimum SNR shift, the communication system is adjusted for operation.

16. The storage medium according to claim 15, wherein:
an NN input of the neural network is the normalized SNR distribution; and
an NN output of the neural network is the normalized minimum SNR shift required for the communication waveform to operate.

17. The storage medium according to claim 15, wherein:
the NN input corresponds to probability masses of a plurality of SNR levels over an SNR range; and
the NN output is the normalized minimum SNR shift corresponding to the NN input.

18. The storage medium according to claim 15, wherein the method further includes:
  generating training samples for the communication waveform by evaluating normalized minimum SNR shifts for a plurality of normalized SNR distributions; and
  training the NN with the training samples by reducing a training loss.

19. The storage medium according to claim 18, wherein:
each training sample includes a normalized SNR distribution and a corresponding normalized minimum SNR shift required for the communication waveform to operate.

20. The storage medium according to claim 19, wherein the method further includes generating each training sample by performing:
  generating a plurality of link conditions, each link condition corresponding to the normalized SNR distribution and an SNR shift of a plurality of SNR shifts; and
  evaluating the performance of the communication waveform using each of the plurality of link conditions to find a minimum SNR shift from the plurality of SNR shifts, wherein the minimum SNR shift is determined as the normalized minimum SNR shift required for the communication waveform to operate.

* * * * *